March 24, 1931.  J. V. JARDINE  1,797,422
PIPE THREADING APPARATUS
Filed Oct. 24, 1927   2 Sheets-Sheet 1
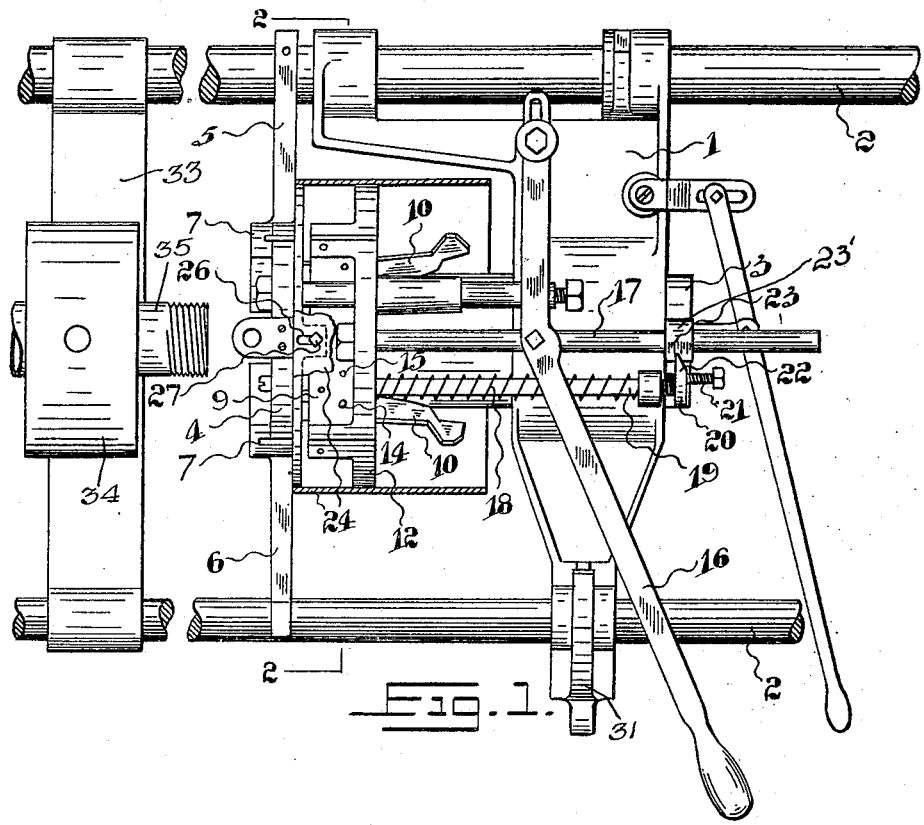
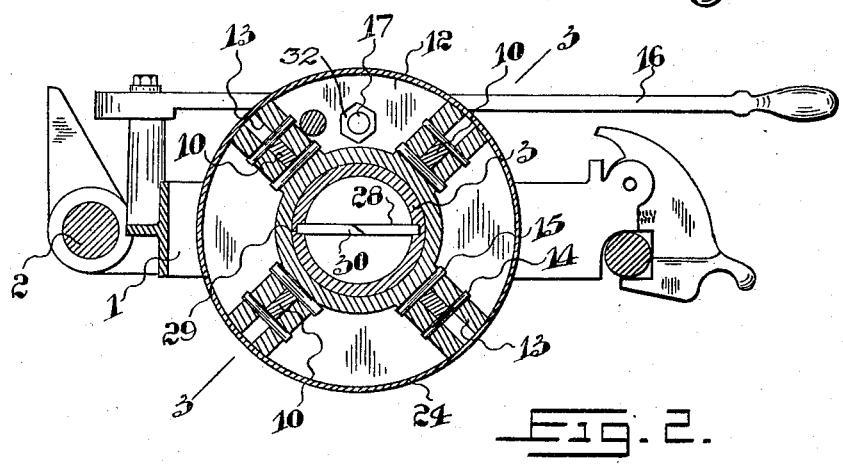
INVENTOR.
J. V. Jardine
BY J. Edward Maybee
ATTY.

March 24, 1931. J. V. JARDINE 1,797,422
PIPE THREADING APPARATUS
Filed Oct. 24, 1927 2 Sheets-Sheet 2
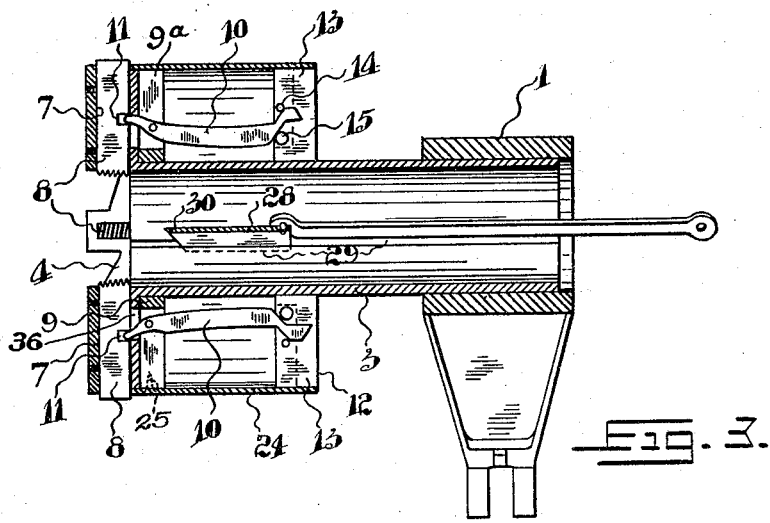
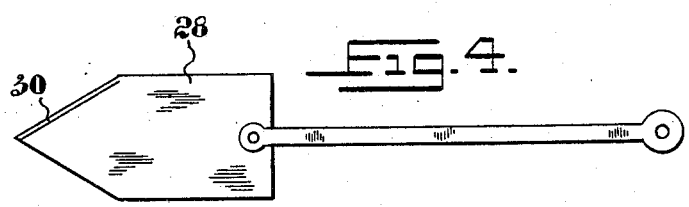
INVENTOR.
J. V. Jardine.
BY J. Edward Maybee
ATTY.

Patented Mar. 24, 1931

1,797,422

UNITED STATES PATENT OFFICE

JAMES VALTEN JARDINE, OF HESPELER, ONTARIO, CANADA, ASSIGNOR TO A. B. JARDINE & COMPANY LIMITED, OF HESPELER, CANADA

PIPE-THREADING APPARATUS

Application filed October 24, 1927. Serial No. 228,390.

This invention relates to apparatus used for threading pipe, rods and the like. The chasers used in threading pipe are tapered, so that the end of the pipe when threaded is also tapered. With apparatus as heretofore used, the dies are stationary, with the result that as the threading proceeds, more and more of the threads of the chaser come into engagement with the pipe, the first cut threads being made gradually deeper and deeper in order to secure the tapered thread, and a gradually increasing amount of power is required to effect the cutting.

My chief object therefore is to devise apparatus which will require a less amount of power to drive and which will permit of more rapid operation.

As pipe fittings manufactured in different plants have not always exactly the same size of thread, so that a given piece of pipe will have a loose fit with one batch of fittings and a tight fit with another batch, a further object of my invention is therefore to provide means whereby pipe may be cut to suit the different sizes of threads of the fittings employed.

A still further object is to provide convenient means for removing the burr usually formed on the interior of the pipe during the cutting operation.

I attain my objects by mounting the dies so that they are radially slidable in the chaser head and providing means for gradually retracting the chasers as the threading proceeds, so that the cutting will all be performed by the first one or two threads, the rate of retraction of the dies thus regulating the taper of the thread, and in conjunction with these means I provide other means whereby the position of the chasers may be varied depending on whether the pipe being threaded is to be used with fittings having a thread larger or smaller than standard.

My apparatus is hereinafter more specifically described and illustrated in the accompanying drawings in which Fig. 1 is a plan view, partly broken away, of the apparatus;

Fig. 2 is a cross section;

Fig. 3 a longitudinal section on the line 3—3 in Fig. 2; and

Fig. 4 a plan view of the trimming mechanism.

In the drawings like numerals of reference indicate corresponding parts in the different figures.

1 is a support which is mounted on shafts 2 extending longitudinally of the machine with which my threading mechanism is employed. At one side the support 1 is provided with a clamp 31 by means of which it may be locked in any desired position longitudinally of the shaft. This support has a hole formed therethrough in which is longitudinally slidable the tubular stem 3 of the die carrying head 4. This chaser carrying head 4 is provided with brackets 5 and 6 whereby the chaser head is also supported directly by the shafts 2. Formed in the head 4 are a plurality of radial grooves 7 in which are slidable the chasers 8.

Slidable longitudinally on the stem 3 is a lever carrying member 9 in recesses or openings 9ª in which are pivoted intermediate their ends a plurality of cam levers 10, one for each chaser. The die carrying head has holes 36 formed therein through which extend one end of each of the levers 10, each of the said lever ends engaging in a notch 11 formed in the side of a chaser. It will thus be seen that by rocking the levers the chasers may be moved radially in the slots as desired.

To actuate the levers I provide the lever-actuating ring 12, which is slidable on the stem 3 and is slotted to form recesses 13 in alinement with the openings 9ª through which the levers extend. Across each recess extend two pins 14 and 15, the lever lying between the pins. The cam levers are inclined, preferably on the arc of a circle, at a small angle to the axis of the device so that as the ring 12 is moved away from the lever carrying-member 9, through their engagement with the pins 14 and 15, the levers are rocked on their pivots to slowly withdraw the chasers from the pipe being threaded, thus producing the angle of the taper in the thread which would not result if the chasers were stationary. Adjacent their free ends the levers are each inclined at a sharp angle to the axis of the device, one side of the sharply inclined portion being engaged by the pin 14 to cause a rapid rocking of the lever to move the chaser out of contact with the pipe, the opposed surface being engaged by the pin 15 to cause a rapid rocking of the lever to move the chaser back into threading position.

On the support 1 is fulcrumed a lever 16, which lever is pivotally connected with a stem 17 slidable through the ring 12 and is provided with a head 32 lying between the ring 12 and chaser-carrying head. When the stem is actuated in one direction, its head engages the chaser-carrying head moving it away from the support, thus drawing the levers through the ring 12, the latter, by means of the pins 14, rocking the levers and causing the gradual retraction of the chasers to form the tapered thread. When the stem is actuated in the opposite direction, the head engages the ring 12 moving the latter away from the chaser-carrying head, to engage the pins 14 with the sharply inclined surfaces of the levers 10 to rock the latter to cause the rapid retraction of the chasers to entirely disengage the latter from the pipe. A spring 18 mounted on a rod 19 and engaging the ring 12 and the support 1 tends to move the ring in a direction to cause the operation of the levers 10 to advance the chasers. This rod 19 has one end secured to the ring 12 and its other end is slidable through a hole in the support 1.

As set out in the statement of the objects of the invention, it is desirable to provide means for adjustment whereby the pipe may be provided with a "tight" or "loose" thread to suit the fittings with which the pipe is employed. I attain this result by providing means for regulating the distance of the lever-actuating ring 12 from the member 9 at the commencement of the cutting operation, which also regulates, of course, the distance of the chasers from the axis of the pipe being threaded. On the end of the rod 19 is a head 20 through which is threaded a set screw 21, which is adapted to engage the support 1 and thus limit the movement of the rod and therefore the movement of the ring 12 towards the member 9. The head 20 is preferably formed with an indicator 22 adapted to co-operate with a scale 23 on a lug 23' integral with the support 1.

A sleeve 24 is preferably secured to the member 9 by means of screws 25. A longitudinal slot 26 is formed in this sleeve, through which slot extends a screw 27 threaded into the chaser-carrying head 4 to connect the parts together. The slot permits sufficient limited movement, when the screw is sufficiently loosened, of the member 9 away from the head 4 to disengage the ends of the levers 10 from the chasers 8, thus permitting the removal of the latter.

On the shafts 2 is slidable a support 33 carrying a sleeve 34 in which the end of the pipe 35 or other part to be threaded is adapted to rotate.

The operation of the apparatus is as follows. The support 1 is moved along the shafts 2 until the chasers are engaged with the pipe, said support 1 is then locked to shaft 2 by means of the clamp 31, when by the rotation of the pipe and with the assistance of lever 16 through the sliding stem 17, the chaser-carrying head 4, together with the member 9, on which the levers 10 are pivoted, and the sleeve 24 will be automatically drawn forward to thread the pipe. During this automatic feeding the ring 12 remains in the same relative position to support 1, being held by the rod 19, and as the levers 10 are drawn through the ring 12, owing to the particular shape of the levers, the chasers are retracted at a rate to produce the desired taper in the thread. When a thread of sufficient length has been cut, the lever 16 and stem 17 are rapidly moved in the reverse direction to engage the head of the latter to engage and cause the ring 12 to engage the sharply inclined surfaces adjacent the end of the levers 10 to rapidly rock the latter and cause the rapid retraction of the chasers and their disengagement of the pipe. This movement also brings head 4 and its component parts back to the original position relative to the support 1. When the lever 16 is released, the spring 18 will return the ring 12 and through it the levers 10 and chasers 8 to normal position to thread the next length of pipe.

In cutting pipe into lengths, generally an inwardly directed burr is formed which it is desirable to remove. I therefore mount within the hollow stem 3 a trimmer 28. This trimmer is slidable in grooves 29 extending horizontally of the stem 3 and is provided with a V-shaped end 30, which thus adapts the device for trimming purposes for any size pipe.

From the above description it will be seen that I have devised a pipe threading apparatus which will satisfactorily attain the objects of my invention as set out in the preamble of this specification.

What I claim as my invention is:

1. In threading apparatus, the combination of a support; a chaser carrying head; threading chasers movable radially of said head; chaser-actuating levers pivoted on said head; a lever-actuating member; manually operable means for causing relative movement between the head and said member to cause the movement of the chasers, a rod having one end engaged with the lever-actuating member, its other end extending through said support; and a spring mounted on said rod, one end of said spring engaging the lever-actuating member and the other end engaging the support.

2. In threading apparatus, the combination of a support; a chaser carrying head; threading chasers movable radially of said head; chaser-actuating levers pivoted on said head; a lever-actuating member; manually operable means for causing relative movement between the head and said member to cause the movement of the chasers; a rod having one end engaged with the lever-actuating member, its other end extending through said support; a spring mounted on said rod, one end of said spring engaging the lever-actuating member and the other end engaging the support; a head on the free end of said rod; and a set screw threaded through said head and adapted to engage the support.

3. In threading apparatus, the combination of a support; a chaser carrying head; threading chasers movable radially of said head; chaser actuating levers pivoted on said head; a lever-actuating member; manually operable means for causing relative movement between the head and said member to cause the movement of the chasers; a rod having one end engaged with the lever-actuating member, its other end extending through said support; a spring mounted on said rod, one end of said spring engaging the lever-actuating member and the other end engaging the support; a head on the free end of said rod; a set screw threaded through said head and adapted to engage the support; a pointer on said head; and a scale on the support with which the pointer is adapted to co-operate.

4. In threading apparatus, the combination of a support; a chaser carrying head; threading chasers movable radially of said head; chaser-actuating levers pivoted on said head; a lever-actuating member, said head and lever-actuating member being adapted to be moved relative to one another, said support and lever-actuating member having alined openings formed therein; a rod slidable through said openings, said rod having a head thereon adapted to engage and actuate either the lever-actuating member or the chaser-carrying head to alter their relative positions; a lever pivoted on said support and also pivotally connected with said rod; and spring means for moving said lever-actuating member towards the chaser-carrying head.

5. In threading apparatus, the combination of a non-rotatable support; a non-rotatable chaser-carrying head slidable axially of said support; a work support in which the work is free to rotate; threading chasers movable radially of said head; chaser actuating levers pivoted on said head; and lever actuating means operable while the chaser-carrying head is sliding relative to the support for automatically and positively rocking said levers to move the chasers away from the work at a gradual rate during the threading operation to produce a tapered thread.

6. In threading apparatus, the combination of a non-rotatable support; a non-rotatable chaser-carrying head slidable axially of said support; threading chasers movable radially of said head; chaser actuating levers pivoted on said head; lever actuating means operable while the chaser-carrying head is sliding relative to the support for automatically and positively rocking said levers to move the chasers away from the work at a gradual rate during the threading operation to produce a tapered thread; and means for adjusting the distance between said means and the chaser-carrying head.

7. In threading apparatus, the combination of a non-rotatable support; a non-rotatable chaser carrying head slidable axially of said support; threading chasers movable radially of said head; chaser actuating levers pivoted on said head; a lever actuating member operable while the chaser-carrying head is sliding relative to the support for automatically and positively rocking said levers to move the chasers away from the work at a gradual rate during the threading operation to produce a tapered thread, said member being movable relative to the support a stem connected at one end with said member and its other end slidable through said support; and means for adjustably limiting the movement of the member relative to the chaser-carrying head.

8. In threading apparatus, the combination of a frame; a support non-rotatably mounted on said frame, said support having a hole formed therethrough; a chaser-carrying head having a tubular stem slidable in the opening in the support, said chaser-carrying head being also slidably supported by said frame and held from rotation thereby; threading chasers movable radially of said head; chaser actuating levers pivoted on said head, said levers being operatively engaged with the chasers whereby the latter may be moved in either direction; a lever-actuating member slidable on said stem; and means for adjusting the position of the lever actuating member relative to the support.

9. In threading apparatus, the combination of a non-rotatable support; a non-rotatable chaser-carrying head slidable axially of said support; threading chasers movable radially of said head; chaser actuating levers pivoted on said head; a lever-actuating member movable axially of said support, said levers being shaped to cause first a gradual withdrawal of the chasers to form a tapered thread and subsequently a rapid withdrawal of the chasers; and means adapted to first move said chaser head away from the lever actuating member to effect said gradual withdrawal and to subsequently move the lever actuating member away from the head to effect the rapid withdrawal.

10. In threading apparatus, the combination of a non-rotatable support; a non-rotatable chaser-carrying head slidable axially of said support; threading chasers movable radially of said head; chaser actuating levers pivoted on said head; a lever-actuating member movable axially of said support, said levers being shaped to cause first a gradual withdrawal of the chasers to form a tapered thread and subsequently a rapid withdrawal of the chasers; means adapted to first move said chaser head away from the lever actuating member to effect said gradual withdrawal and to subsequently move the lever actuating member away from the head to effect the rapid withdrawal; spring means tending to move the lever-actuating member towards the head; and means for limiting the movement of the lever actuating member towards the head.

11. In threading apparatus, the combination of a non-rotatable support; a non-rotatable chaser-carrying head slidably axially of said support; threading chasers movable radially of said head; levers pivoted on said head adapted to positively move said chasers away from the work; and lever-actuating means independent of the work operable while the chaser-carrying head is sliding relative to the support for automatically and positively rocking said levers to move the chasers away from the work at a gradual rate during the threading operation to produce a tapered thread.

12. In threading apparatus, the combination of a non-rotatable support; a non-rotatable chaser-carrying head slidable axially of said support; threading chasers movable radially of said head; levers pivoted intermediate their ends on said head, said chasers each having a notch in its side into which one end of a lever extends; and lever-actuating means engaging the other ends of the levers and operable while the chaser-carrying head is sliding relative to the support for automatically and positively rocking said levers to move the chasers away from the work at a gradual rate during the threading operation to produce a tapered thread.

13. In threading apparatus, the combination of a non-rotatable support; a non-rotatable chaser-carrying head slidable axially of said support; threading chasers movable radially of said head; levers pivoted on said head adapted to positively move said chasers away from the work; and lever-actuating means independent of the work operable while the chaser-carrying head is sliding relative to the support for automatically and positively rocking said levers to move the chasers away from the work at a gradual rate during the threading operation to produce a tapered thread, the surfaces of the levers engaged by said means being curved longitudinally of the levers on a line adapted to maintain a substantially constant rate of increase in the angle of the levers to the axis of the head during the threading operation.

Signed at Preston this seventh day of October, 1927.

JAMES VALTEN JARDINE.